US012349854B2

(12) United States Patent
Takano

(10) Patent No.: US 12,349,854 B2
(45) Date of Patent: Jul. 8, 2025

(54) WORK MACHINE

(71) Applicant: MAKITA CORPORATION, Anjo (JP)

(72) Inventor: Hideaki Takano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 400 days.

(21) Appl. No.: 17/956,080

(22) Filed: Sep. 29, 2022

(65) Prior Publication Data

US 2023/0121653 A1 Apr. 20, 2023

(30) Foreign Application Priority Data

Oct. 18, 2021 (JP) ................................ 2021-170516

(51) Int. Cl.
*A47L 9/00* (2006.01)
*G10K 11/178* (2006.01)

(52) U.S. Cl.
CPC ...... *A47L 9/0081* (2013.01); *G10K 11/17861* (2018.01); *G10K 11/17881* (2018.01); *G10K 11/17883* (2018.01); *G10K 2210/121* (2013.01); *G10K 2210/3028* (2013.01)

(58) Field of Classification Search
CPC ............ A47L 9/0081; G10K 11/17861; G10K 11/17881; G10K 11/17883; G10K 2210/121; G10K 2210/3028
USPC ...... 381/71.3, 71.8, 71.1, 71.5, 71.11, 71.12, 381/359, 122, 111, 355, 91, 123
See application file for complete search history.

(56) References Cited

U.S. PATENT DOCUMENTS

| | | | | | |
|---|---|---|---|---|---|
| 5,384,853 | A * | 1/1995 | Kinoshita | ........ | G10K 11/17883 381/71.12 |
| 5,499,423 | A * | 3/1996 | Joo | ................. | G10K 11/17861 381/71.5 |
| 5,832,095 | A * | 11/1998 | Daniels | ............ | G10K 11/17854 381/94.2 |
| 2002/0080978 | A1* | 6/2002 | Kakuhari | ......... | G10K 11/17825 381/71.5 |
| 2017/0193981 | A1* | 7/2017 | Christoph | ........ | G10K 11/17875 |
| 2019/0275657 | A1 | 9/2019 | Lanquist | | |

* cited by examiner

*Primary Examiner* — Vivian C Chin
*Assistant Examiner* — Con P Tran
(74) *Attorney, Agent, or Firm* — Oliff PLC

(57) ABSTRACT

A work machine includes microphones inside the housing. The microphones are configured to collect sound inside the housing, and output sound signals that are electrical signals corresponding to the collected sound. The sound includes an operating noise generated inside the housing due to motion of a machine. The microphones are arranged at different locations inside the housing. The work machine is configured to execute a process related to the operating noise based on the sound signals from the microphones.

12 Claims, 16 Drawing Sheets

WORK MACHINE

CROSS-REFERENCE TO RELATED APPLICATIONS

This application claims the benefit of Japanese Patent Application No. 2021-170516 filed on Oct. 18, 2021 with the Japan Patent Office, the entire disclosure of which is incorporated herein by reference.

BACKGROUND

The present disclosure relates to a work machine.

U.S. Patent Application Publication No. 2019/0275657 discloses an electric power tool to which active noise control (ANC) is applied. ANC is a technique for canceling noise by using sound collected by a microphone to generate a sound having an inverted phase of the noise at a location where the noise is desired to be canceled.

SUMMARY

A sound signal output as an electrical signal from the microphone by sound collection may sometimes contain unnecessary components other than operating noise to be collected. For example, the sound signal may contain pseudo-sound component (specifically, a fluid pressure fluctuation component) as a wind noise component. The pseudo-sound component contained in the sound signal may adversely affect the results of certain processes based on the sound signal.

For example, since the pseudo-sound component contained in the sound signal is not the type of noise component audible to a user who works on a work machine, the pseudo-sound component may adversely affect noise reduction by ANC. When performing a process of detecting a failure in the work machine based on the sound signal, the pseudo-sound component can also be a cause of lowering accuracy of failure detection.

When the microphone collects external noise entering a housing from outside, external noise components contained in the sound signal may adversely affect noise reduction by ANC and failure detection.

Similar effects can occur not only in ANC and failure detection but in various scenes. Specifically, when certain processes are performed based on the sound signal from the microphone, unnecessary components contained in the sound signal other than the operating noise may adversely affect the certain processes.

One aspect of the present disclosure is to reduce the undesired influence which may occur on processes based on the sound signal from the microphone in the work machine during the execution, due to unnecessary components contained in the sound signal other than the operating noise.

According to one aspect of the present disclosure, a work machine is provided. The work machine includes a machine. The work machine includes a housing. The housing at least partly houses the machine.

The work machine includes microphones. Each of the microphones is configured to collect sound inside the housing, and output a sound signal that is an electrical signal corresponding to the collected sound. The sound includes operating noise generated inside the housing by motion of the machine. The microphones are arranged at different locations inside the housing.

The work machine includes a processor. The processor is configured to execute a process related to the operating noise based on the sound signals from the microphones.

When the sound signals from the microphones contain an operating noise component and other unnecessary components, characteristics of the combination of the operating noise component and the unnecessary components normally differ between the microphones depending on the arrangement of the microphones and difference in sound source. This difference in characteristics can be used to suppress undesired results due to the unnecessary components other than the operating noise contained in the sound signals at the time of execution of the process based on the sound signals.

Thus, according to one aspect of the present disclosure, the influence on the process due to the unnecessary components other than the operating noise contained in the sound signals can be reduced in the work machine.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. Overview of Embodiments

Figure 1:
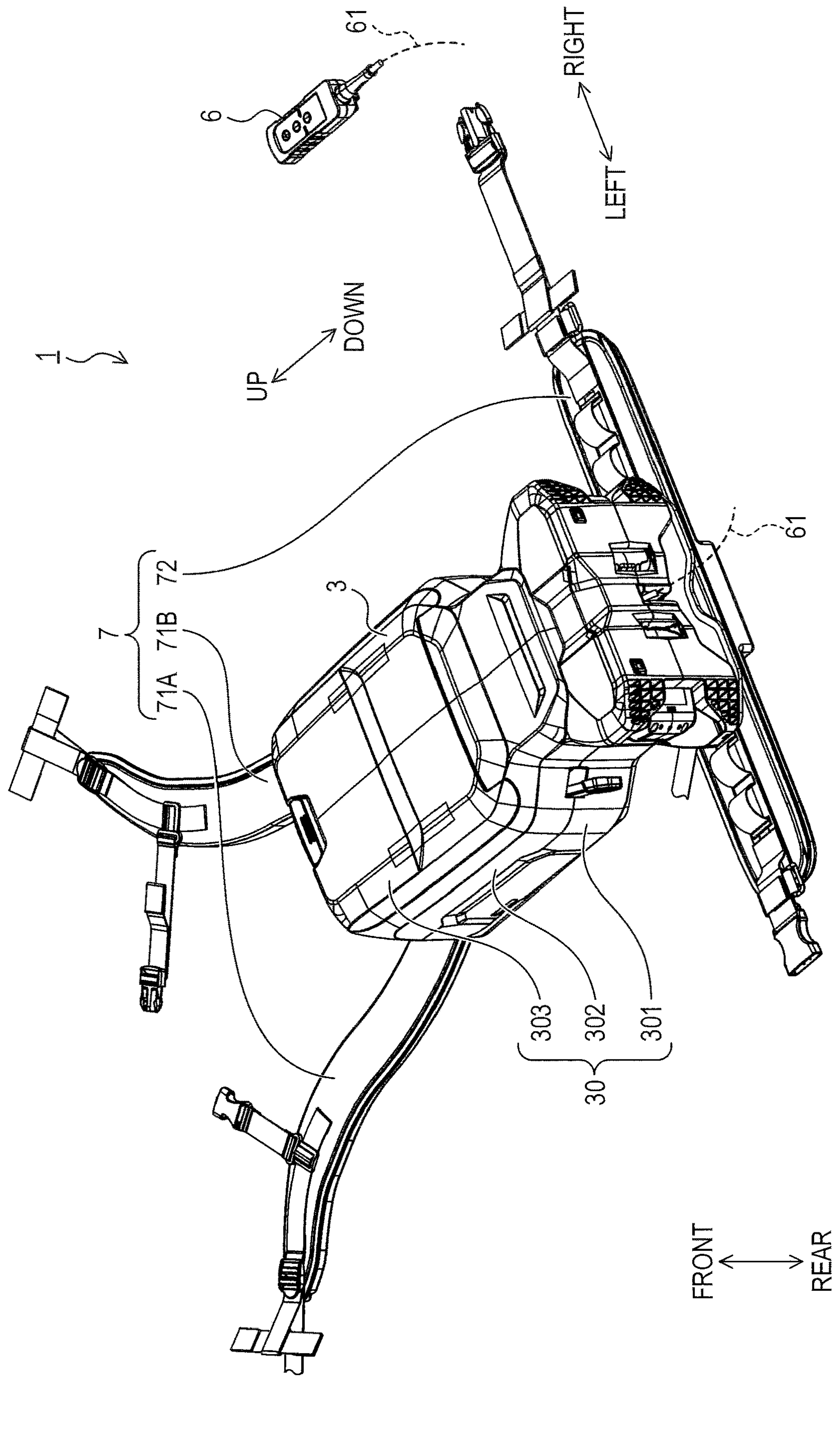
FIG. 1 is a perspective view showing the appearance of a dust collector according to one example embodiment.

A work machine in one embodiment may include a machine. The machine may be configured to work for a specific operation. Additionally or alternatively, the work machine may include a housing. The housing may at least partly house the machine.

Additionally or alternatively, the work machine may include microphones. The microphones may be arranged to collect sound inside the housing. The microphones may collect sound inside the housing including operating noise generated inside the housing by motion of machine. The microphones may be configured to output sound signals that are electrical signals corresponding to the collected sound. The microphones may be arranged inside the housing. The microphones may be arranged at different locations inside the housing.

Additionally or alternatively, the work machine may include a processor. The processor may be configured to execute a process based on the sound signals from the microphones. The processor may be configured to execute the process related to the operating noise based on the sound signals from the microphones.

When the sound signals from the microphones contain an operating noise component and other unnecessary components, characteristics of the combination of the operating noise component and the unnecessary components differ between the microphones depending on the arrangement of the microphones and difference in sound source.

This difference in characteristics can be used to execute a process focusing on the operating noise component contained in the sound signals, and suppress undesired results due to the unnecessary components other than the operating noise contained in the sound signals at the time of execution of the process based on the sound signals.

In one embodiment, the processor may be configured to execute a process based on the sound signals from the microphones and locations of the microphones inside the housing. The processor may be configured to execute a process related to the operating noise based on the sound signals from the microphones and the locations of the microphones inside the housing.

In one embodiment, the process related to the operating noise may include processing the sound signals from the microphones such that the operating noise is enhanced. Processing the sound signals such that the operating noise is enhanced may include superimposing the sound signals from the microphones.

In one embodiment, the process related to the operating noise may include generating an operating noise signal which is a sound signal with the operating noise enhanced. The operating noise signal may be generated by superimposing the sound signals from the microphones. The operating noise signal may be generated by superimposing the sound signals from the microphones such that the operating noise is enhanced.

The process related to the operating noise may include generating an operating noise signal based on the locations of the microphones inside the housing. Based on the operating noise signal generated as above, a process focusing on the operating noise component can be executed. It is possible to suppress undesired results due to the unnecessary components contained in the sound signals.

In one embodiment, the process related to the operating noise may include converting one or more sound signals output from one or more of the microphones to one or more virtual-sound signals. The virtual-sound signals each may correspond to a sound signal output from a virtual microphone when it is assumed that the operating noise propagates to a common specific location and is collected by the virtual microphone at the common specific location. The one or more virtual-sound signals may be used for superimposing the sound signals. Generating the operating noise signal may include superimposing the virtual-sound signals. The one or more of the microphones may be all of the microphones.

In one embodiment, the microphones may include one or more first microphones and one second microphone. The process related to the operating noise may include converting a first sound signal output from each of the one or more first microphones to a virtual-sound signal. The virtual-sound signal may correspond to a sound signal output from the second microphone when it is assumed that the operating noise propagates to the second microphone and is collected by the second microphone. Generating an operating noise signal may include superimposing the virtual-sound signal on a second sound signal output from the second microphone.

In one embodiment, converting the first sound signal to the virtual-sound signal may include inputting the first sound signal to a transfer function for a corresponding first microphone, thereby converting the first sound signal output from the corresponding first microphone to the virtual-sound signal. The transfer function may be a transfer function based on transfer characteristics of sound from a source of the operating noise to the second microphone relative to the transfer characteristics of sound from the source of the operating noise to the corresponding first microphone.

In one embodiment, converting the first sound signal to the virtual-sound signal may include inputting the first sound signal to a delayer for a corresponding first microphone, thereby converting the first sound signal output from the corresponding first microphone to the virtual-sound signal. The delayer may be a delayer based on transfer delay of sound to the second microphone relative to the corresponding first microphone for the operating noise from the source.

By using the transfer function or the delayer to convert the sound signal to a virtual-sound signal and superimpose the virtual-sound signal on other sound signal, it is possible to generate the operating noise signal with the operating noise component well enhanced among the operating noise component and the unnecessary components.

In one embodiment, the work machine may include a speaker. When the work machine includes a speaker, the process related to the operating noise may further include causing the speaker to output a control sound for inhibiting the operating noise from propagating outside the housing.

In a case of inhibiting the operating noise from propagating outside the housing by the control sound, the influence of unnecessary components contained in the sound signals from the microphones can be reduced and appropriate control sound can be generated based on the operating noise component. Accordingly, the operating noise that propagates outside the housing can be effectively reduced.

In one embodiment, the microphones may include two or more microphones arranged at the same distance from the source of the operating noise. As to the sound signals of the microphones arranged at the same distance from the source of the operating noise, the operating noise signal with the operating noise enhanced can be generated by simply superimposing these sound signals.

In one embodiment, the housing may has an opening. The microphones may include two or more microphones arranged at different distances from at least one of the source of the operating noise and the opening. According to the arrangement of the microphones as above, the influence of external noise from the opening can be reduced, and a process based on the sound signals from the two or more microphones can be executed. For example, while canceling an external noise component contained in the sound signals, it is possible to superimpose the sound signals from the two or more microphones so as to enhance the operating noise, and generate an operation noise signal.

In one embodiment, when the housing has an opening, the microphones may include two or more microphones arranged at the same distance from at least one of the source of the operating noise and the opening. Alternatively, the microphones may include two or more microphones arranged at the same distance from the source of the operating noise and the opening.

In one embodiment, a path for controlling an airflow generated by motion of the machine may be provided between the machine and the opening inside the housing. The microphones may include two or more microphones arranged at different locations in the path.

The operating noise is likely to propagate outside the housing from the opening through the path. Accordingly, if the microphones are arranged in the path, the operating noise can be effectively collected. On the other hand, if the microphones are arranged in the path, wind noise is likely to be collected by the microphones. In an environment as such, it is meaningful to be able to generate the operating noise signal with the operating noise enhanced while the wind noise component is canceled, by superimposing of the sound signals from the microphones.

In one embodiment, when the work machine has the opening and the path, the microphones may include two or more microphones arranged at different locations in the path and at different distances along the path from the opening. According to this arrangement of the microphones, the influence of external noise from the opening can be reduced, and a process based on the sound signals from the two or more microphones can be executed. For example, external noise components contained in the sound signals can be reduced by superimposing the sound signals from the two or more microphones.

In one embodiment, when the work machine has the opening and the path, the microphones may include two or more microphones arranged at different locations in the path, at the same distance from the machine corresponding to the source of the operating noise, and at different distances along the path from the opening.

In one embodiment, when the work machine has the opening and the path, the microphones may include two or more microphones arranged at different locations in the path, at different distances from the machine corresponding to the source of the operating noise, and at the same distance along the path from the opening. Arrangement of the microphone as such also allows execution of a process based on the sound signals from the two or more microphones while reducing the influence of the external noise from the opening.

In one embodiment, when the work machine has the opening and the path, the microphones may include two or more microphones arranged at different locations in the path, and at different distances or the same distance along the path from the machine corresponding to the source of the operating noise and the opening.

One or more of the components of the aforementioned work machine may be removed as desired. The work machine may include an additional component as desired. One or more of the components of the work machine may be replaced with another component or components as desired.

2. Specific Exemplary Embodiment

2.1. Configuration of Dust Collector

A configuration of a dust collector 1 will be described hereinafter, as an example of a work machine. For convenience of description, the direction (front, rear, up, down, left and right) relative to the dust collector 1 is defined as shown in FIGS. 1 to 6 in the present embodiment.

As shown in FIG. 1, the dust collector 1 of the present embodiment includes a main body 3, an operation device 6, and attachments 7. The attachments 7 include shoulder belts 71A, 71B, and a waist belt 72. The shoulder belts 71A, 71B and the waist belt 72 are attached to the rear surface of the main body 3.

The shoulder belt 71A extends from near the upper left end of the main body 3. The shoulder belt 71B extends from near the upper right end of the main body 3. The waist belt 72 extends from near the bottom end of the main body 3. The attachments 7 are used for an operator of the dust collector 1 to carry the main body 3 on its back.

The operation device 6 includes a switch to start or stop the dust collector 1. The operation device 6 is manipulated by the operator. The operation device 6 is connected, via a cable 61, to the main body 3 near the center of the bottom end of the main body 3.

Figure 2:
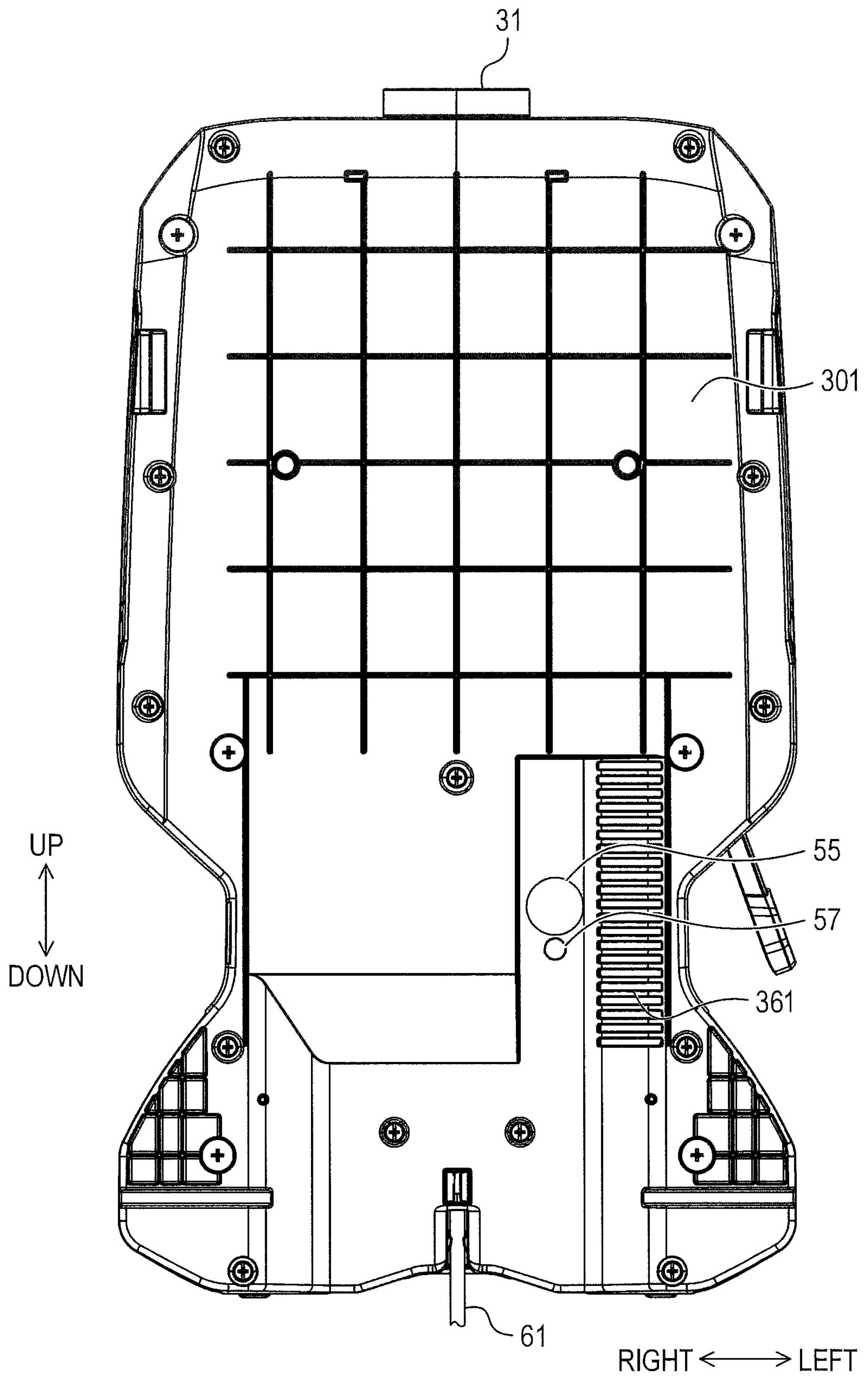
FIG. 2 is a bottom view of a dust collector main body.
Figure 3:
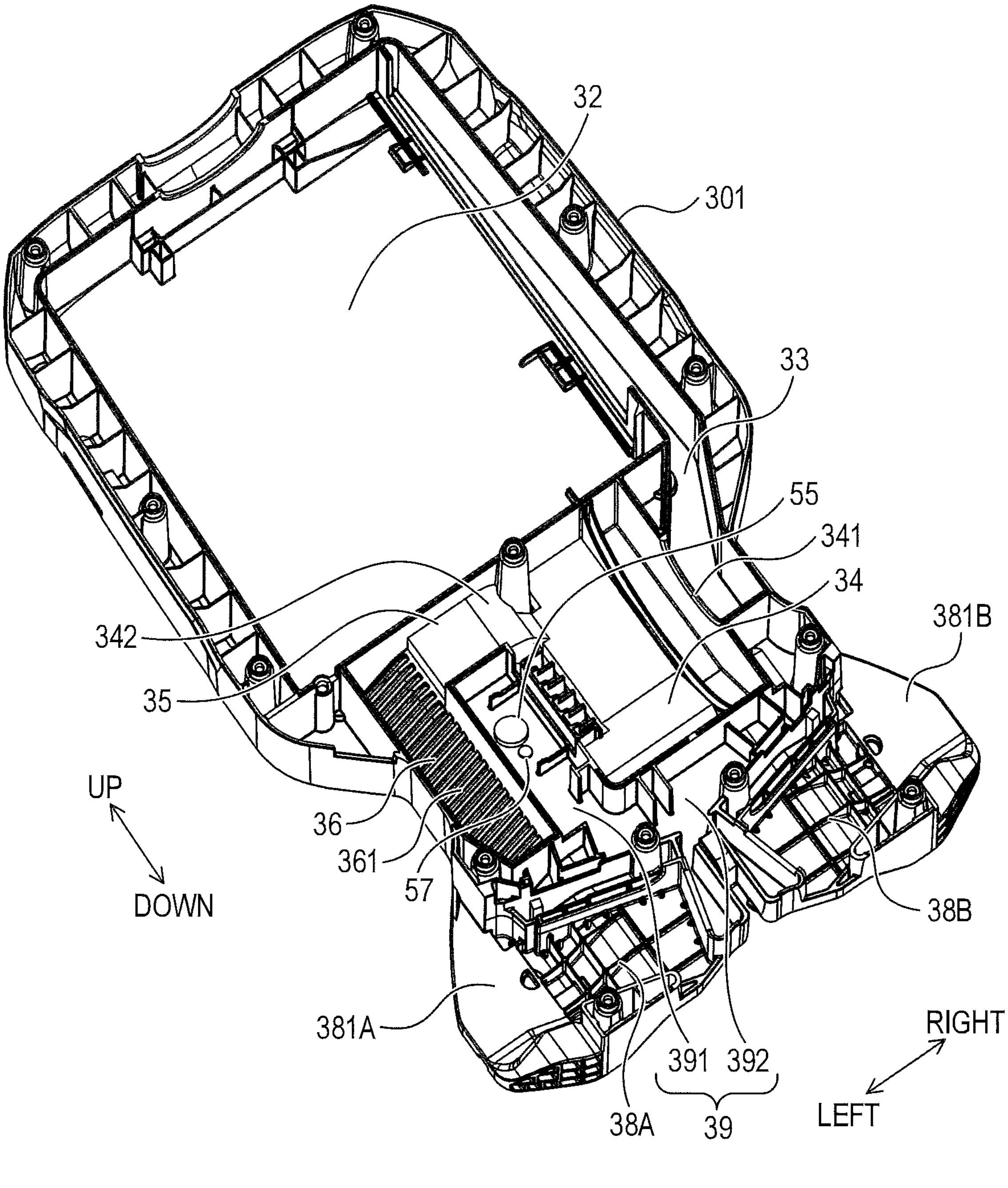
FIG. 3 is a perspective view of a rear housing with its internal components removed, as seen from a joining surface between a front housing and the rear housing.
Figure 4:
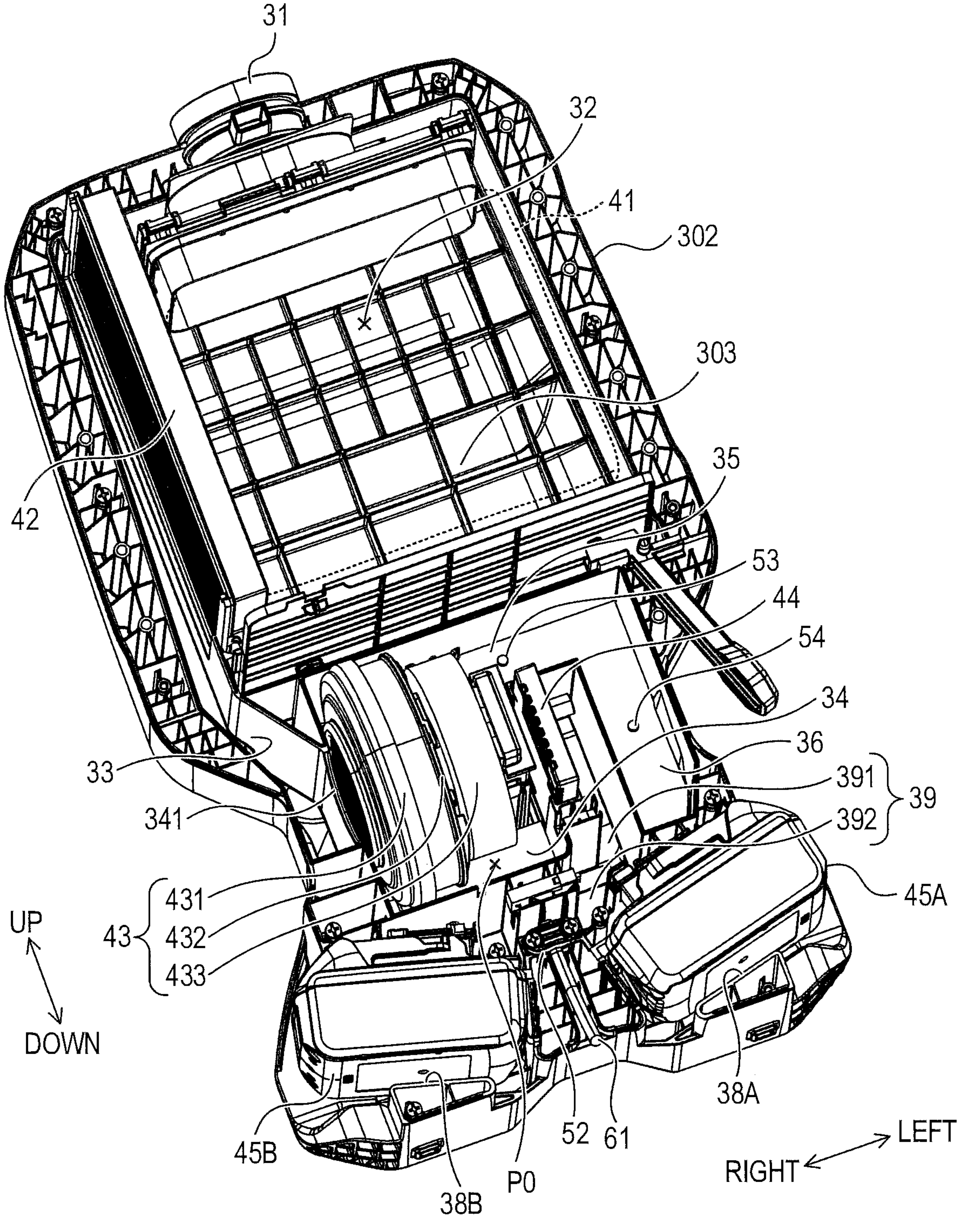
FIG. 4 is a perspective view showing an interior of the dust collector with the rear housing removed from the collector main body.
Figure 5:
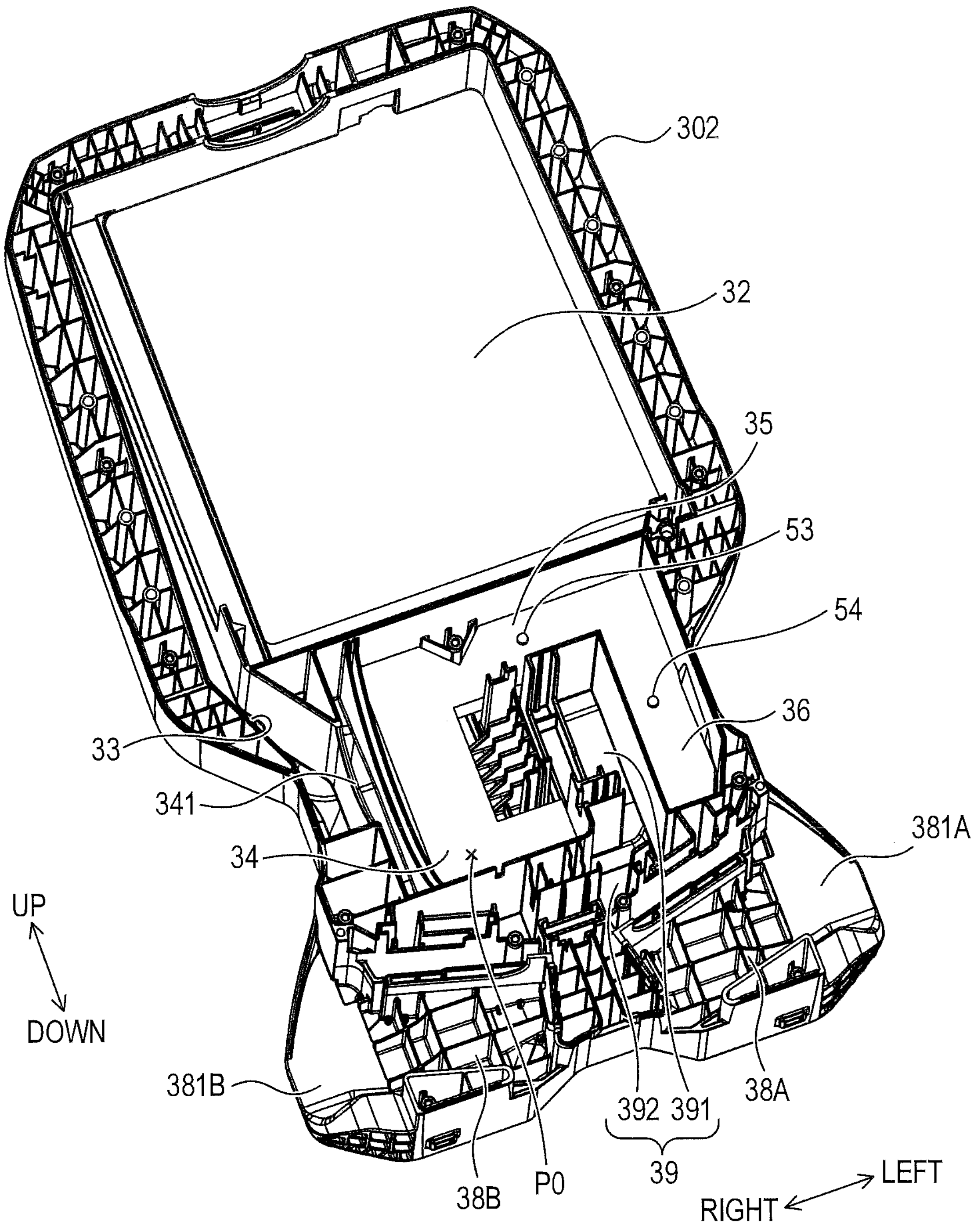
FIG. 5 is a perspective view of the front housing with its internal components removed, as seen from the joining surface between the front housing and the rear housing.

The main body 3 includes a housing 30 for housing major electrical and/or mechanical components of the dust collector 1. The housing 30 includes a rear housing 301, a front housing 302, and a plate 303. FIGS. 2 and 3 show a configuration of the rear housing 301. FIGS. 4 and 5 show a configuration of the front housing 302.

The rear housing 301 is a bottomed box-shaped member having an inner surface facing the front. The front housing 302 is a frame-shaped member with an opening. The plate 303 is a plate-shaped member that closes the opening of the front housing 302 from the front. The housing 30 is, for example, mold by injecting a resin material.

As shown in FIGS. 3, 4, and 5, the housing 30 includes a suction port 31, a dust collecting chamber 32, a first flow path 33, a motor chamber 34, a second flow path 35, a third flow path 36, a first battery compartment 38A, a second battery compartment 38B, and a component placement portion 39.

The suction port 31 is provided in the central portion of the top end of the housing 30. The suction port 31 is connected to a first end of a flexible hose (not shown). A second end of the hose is connected to a nozzle having a suction port (not shown).

As shown in FIG. 4, the dust collecting chamber 32 is a rectangular internal chamber provided on the upper side of the housing 30. The dust collecting chamber 32 stores a dust bag 41 that is connected to the suction port 31. The dust bag 41 is made of, for example, paper. The dust bag 41 traps and collects dust sucked from the suction port 31.

The first flow path 33 is provided along the right side of the dust collecting chamber 32. The bottom end of the first flow path 33 is connected to the motor chamber 34. A filter

42 is arranged at the boundary between the first flow path 33 and the dust collecting chamber 32. Examples of the filter 42 may include a high efficiency particulate air filter (HEPA).

The motor chamber 34 is an internal chamber provided below the dust collecting chamber 32. As shown in FIGS. 3 to 6, the motor chamber 34 includes an inlet port 341 in the central portion of the right end of the motor chamber 34. The inlet port 341 is connected to the first flow path 33. The motor chamber 34 further includes an outlet port 342 in the upper portion of the left end of the motor chamber 34. The outlet port 342 is connected to the second flow path 35. The motor chamber 34 houses a drive machine 43. A thick dotted arrow shown in FIG. 6 conceptually represents an airflow.

The drive machine 43 includes a fan 431, a motor 432, and a damper 433. The fan 431 is connected to a rotation shaft of the motor 432. The fan 431 receives power from the motor 432 and is rotationally driven. As a result, an airflow that travels from the inlet port 341 toward the outlet port 342 of the motor chamber 34 is generated.

The damper 433 is an annular member that covers the motor 432. The damper 433 absorbs noise generated by the motor 432. In FIG. 4, the motor 432 is arranged in the center of the damper 433 although not shown because the motor 432 is covered with the damper 433.

The second flow path 35 is an exhaust path provided on the upper side of the motor chamber 34 and extending leftward from the motor chamber 34. The second flow path 35 connects the outlet port 342 of the motor chamber 34 with the third flow path 36.

The third flow path 36 is an exhaust path provided to the left of the motor chamber 34 and extending downward. The third flow path 36 includes an exhaust port 361 in its downstream portion. As shown in FIGS. 2 and 3, the exhaust port 361 has the form of a group of slits that are formed on the rear surface of the housing 30.

The second flow path 35 and the third flow path 36 form an L-shaped exhaust path, and controls the airflow from the motor chamber 34 to the exhaust port 361. Specifically, the second flow path 35 and the third flow path 36 guide the airflow from the motor chamber 34 out of the housing 30 through the exhaust port 361.

Microphones 53, 54 are installed in the exhaust path. The microphone 53 is used as a first reference microphone, and the microphone 54 is used as a second reference microphone in ANC.

Hereinafter, the microphone 53 is referred to as a first reference microphone 53, and the microphone 54 is referred to as a second reference microphone 54. The first reference microphone 53 and the second reference microphone 54 are collectively referred to as reference microphones 53, 54.

The reference microphones 53, 54 are arranged in the exhaust path inside the housing 30 in order to collect sound inside the housing 30. The sound to be collected includes operating noise of the dust collector 1 generated inside the housing 30 by the motion of the drive machine 43 inside the housing 30. The operating noise includes sounds generated by the motor 432 and the fan 431 of the drive machine 43. The reference microphones 53, 54 output sound signals that are electrical signals corresponding to the collected sound.

The operating noise generated by the drive machine 43 propagates through the exhaust path to the exhaust port 361, and propagates outside the housing 30 from the exhaust port 361. With the reference microphones 53, 54 arranged in the exhaust path, the operating noise leaking outside can be effectively collected.

The reference microphones 53, 54 are arranged at different locations in the exhaust path. Specifically, the reference microphones 53, 54 are arranged at different distances from the drive machine 43. The reference microphones 53, 54 are arranged at different distances along the exhaust path from the exhaust port 361. The operating noise generated by the drive machine 43, in other words, the operating noise collected by the reference microphones 53, 54, is the noise inhibited from propagating outside the housing 30 by ANC (hereinafter, referred to as target noise).

In the main body 3 configured as above, when airflow is generated by the motion of the drive machine 43, external air is sucked into the internal space of the housing 30 through the suction port 31. The sucked external air first enters the dust collecting chamber 32, and passes through the dust bag 41 attached to the suction port 31. This passing though of the dust bag 41 allows the dust contained in the external air to be trapped.

The air that has passed through the dust bag 41 reaches the first flow path 33 via the filter 42. The air that has reached the first flow path 33 passes through the motor chamber 34 and the second flow path 35 to the third flow path 36, and is discharged to outside the housing 30 through the exhaust port 361. The operating noise that is about to propagate outside the housing 30 through the exhaust port 361 is collected by the reference microphones 53, 54 arranged in the exhaust path as the aforementioned target noise.

The first battery compartment 38A of the housing 30 defines a space that houses the first battery pack 45A. The first battery compartment 38A is provided near the bottom end of the housing 30. The first battery compartment 38A includes a first battery mounting port 381A that is open near the lower left end of the housing 30.

The second battery compartment 38B defines a space that houses the second battery pack 45B. The second battery compartment 38B is provided near the bottom end of the housing 30. The second battery compartment 38B includes a second battery mounting port 381B that is open near the lower right end of the housing 30. The first and second battery packs 45A, 45B are respectively inserted from the first and second battery mounting ports 381A, 381B to the first and second battery compartments 38A, 38B.

The component placement portion 39 is an internal space located between the motor chamber 34, the second flow path 35, the third flow path 36, and the first and second battery compartments 38A, 38B. Various electrical components are arranged in this internal space.

The component placement portion 39 includes a vertical portion 391 and a horizontal portion 392 that communicates with the vertical portion 391. The vertical portion 391 corresponds to a portion surrounded on three sides by walls of the motor chamber 34, the second flow path 35, and the third flow path 36. The horizontal portion 392 corresponds to a portion that is placed between the motor chamber 34 and the first and second battery compartments 38A, 38B.

A connector 52 is arranged in the horizontal portion 392. The connector 52 is arranged between the first battery compartment 38A and the second battery compartment 38B. The connector 52 is provided to connect a cable 61 of the operation device 6 with an internal circuit.

A drive controller 44, a control speaker 55 and an error microphone 57 are arranged in the vertical portion 391. The control speaker 55 and the error microphone 57 are used in ANC. The control speaker 55 and the error microphone 57 are mounted to be exposed outside the housing 30 through mounting holes formed on the bottom surface of the rear housing 301 and to be directional towards the outside of the housing 30.

As shown in FIG. 4, the drive controller 44 is attached to a wall that defines a boundary between the vertical portion 391 and the motor chamber 34. The drive controller 44 is a circuit board that performs power supply control, motor control, noise control, and so on.

The error microphone 57 is arranged at a location corresponding to a noise canceling point and not directly hit by the airflow generated by the drive machine 43. The location corresponding to the noise canceling point is where the error microphone 57 can be assumed to be at the noise canceling point. The location corresponding to the noise canceling point is specifically in the vicinity of the exhaust port 361.

The control speaker 55 outputs the control sound to cancel the target noise. The reference microphones 53, 54, the control speaker 55, and the error microphone 57 are arranged so that time for the control sound emitted from the control speaker 55 to reach the noise canceling point is shorter than time for the target noise to directly reach the noise canceling point. During the time difference, a process to generate the control sound is executed.

The control speaker 55 emits the control sound toward the outside of the housing 30. The error microphone 57 collects a combined sound of the target noise discharged from the exhaust port 361 and the control sound. The control speaker 55 is capable of emitting a sufficiently louder sound than the target noise. The error microphone 57 is capable of receiving the combined sound of the target noise and the control sound without distortion.

2.2. Drive Controller

Figure 7:
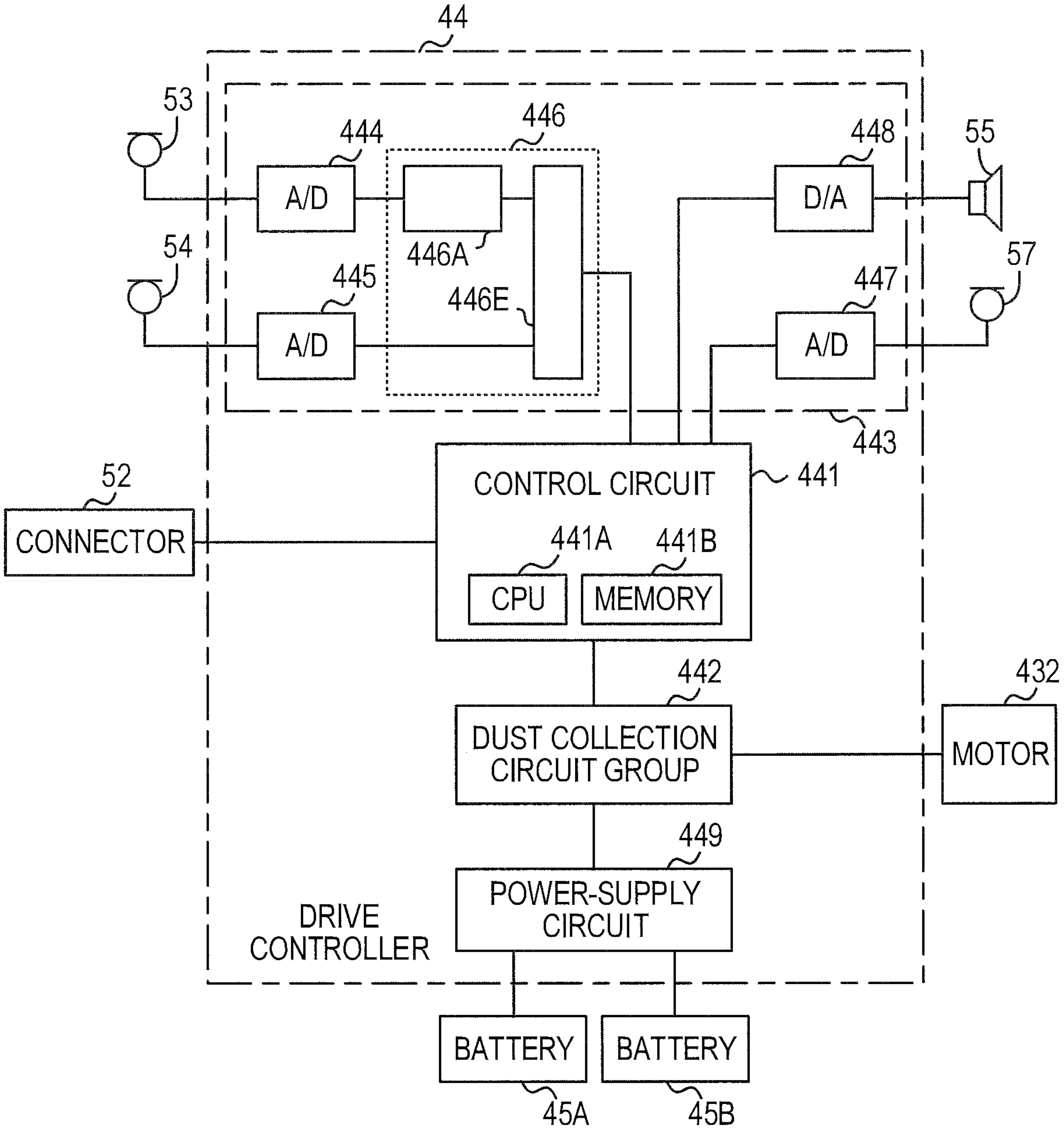
FIG. 7 is a block diagram showing an electrical configuration of the dust collector.

As shown in FIG. 7, the drive controller 44 includes a control circuit 441, a dust collection circuit group 442, a signal processing circuit group 443, and a power-supply circuit 449.

The power-supply circuit 449 delivers electric power supplied from the first and second battery packs 45A, 45B to each part of the dust collector 1 at an appropriate voltage. The control circuit 441 is configured as a microcomputer. The control circuit 441 includes a CPU 441A and a memory 441B.

As another example, the control circuit 441 may include, in place of or in addition to the microcomputer, a combination of electronic components such as, for example, discrete devices. The control circuit 441 may include a digital signal processor (DSP) and/or an application specific IC (ASIC). The control circuit 441 may include an application specific standard product (ASSP). The control circuit 441 may include a programmable logic device.

The dust collection circuit group 442 includes circuits necessary to perform the function as the dust collector 1. Specifically, the dust collection circuit group 442 includes a motor drive circuit and a battery switching circuit. The motor drive circuit drives the motor 432. The battery switching circuit appropriately switches a supply source of electric power between the first and second battery packs 45A, 45B depending on the remaining energies of the first and second battery packs 45A, 45B.

The signal processing circuit group 443 includes various types of circuits necessary to perform the function as a noise controller. The signal processing circuit group 443 includes first and second analog/digital (A/D) converters 444, 445 for the reference microphones 53, 54, a signal process circuit 446, an A/D converter 447 for the error microphone 57, and a digital/analog (D/A) converter 448.

The first A/D converter 444 converts a sound signal from the first reference microphone 53 to a digital signal and supplies the digital signal to the signal process circuit 446. The second A/D converter 445 converts a sound signal from the second reference microphone 54 to a digital signal and supplies the digital signal to the signal process circuit 446.

The signal process circuit 446 is configured to convert the sound signals from the reference microphones 53, 54, which are converted to the digital signals, to a superimposed signal, and input the superimposed signal to the control circuit 441. The superimposed signal corresponds to an operating noise signal with enhanced operating noise of the drive machine 40 inside the housing 30. The superimposed signal is generated by superimposing the sound signals from the reference microphones 53, 54 so as to selectively enhance a target noise component among the target noise component and other unnecessary components contained in the sound signals from the reference microphones 53, 54.

The signal process circuit 446 shown in FIG. 7 includes a delayer 446A and a synthesizer 446E. The delayer 446A delays the sound signal from the first reference microphone 53 input through the first A/D converter 444 for a specified period of time, and inputs the delayed sound signal to the synthesizer 446E.

According to the present embodiment, the first reference microphone 53 is located closer to the drive machine 43 that generates the target noise than the second reference microphone 54. Thus, the target noise that propagates from the drive machine 43 is first collected by the first reference microphone 53, and thereafter collected by the second reference microphone 54.

According to an example arrangement of the reference microphones 53, 54, the target noise generated at time T0 is collected by the first reference microphone 53 at time T1, and thereafter collected by the second reference microphone 54 at time T2. In this case, the delayer 446A is configured to delay the sound signal from the first reference microphone 53 by time $\Delta T=(T2-T1)$ and output the delayed sound signal. The time $\Delta T$ corresponds to a transfer delay of the target noise to the second reference microphone 54 relative to the first reference microphone 53.

Specifically, the delayer 446A converts the sound signal from the first reference microphone 53 to a virtual-sound signal by signal delay. The virtual-sound signal is a sound signal output from the second reference microphone 54 when it is assumed that the corresponding target noise propagates to the second reference microphone 54 and is collected by the second reference microphone 54.

The signal delay time $\Delta T$ to be achieved by the delayer 446A is geometrically determined by the location of the drive machine 43 that generates the target noise inside the housing 30 and the locations of the reference microphones 53, 54 relative to the drive machine 43, in particular by the relative location of the reference microphones 53, 54 to the drive machine 43. The delayer 446A is set up in accordance with the relative location so that the sound signal from the first reference microphone 53 can be converted to the aforementioned virtual-sound signal.

By the work of the delayer 446A, the sound signal from the first reference microphone 53 is processed so that the target noise component contained in the sound signal from the first reference microphone 53 is in phase with the target noise component contained in the sound signal from the second reference microphone 54. As a result, the synthesizer 446E, which receives the sound signal from the first reference microphone 53 intentionally delayed by the delayer 446A and the sound signal from the second reference microphone 54, can generate the superimposed signal of the sound signals with enhanced target noise component.

The synthesizer 446E superimposes the intentionally delayed sound signal from the first reference microphone 53 on the sound signal from the second reference microphone 54 that is not intentionally delayed, and inputs the superimposed signal to the control circuit 441.

Figure 8:
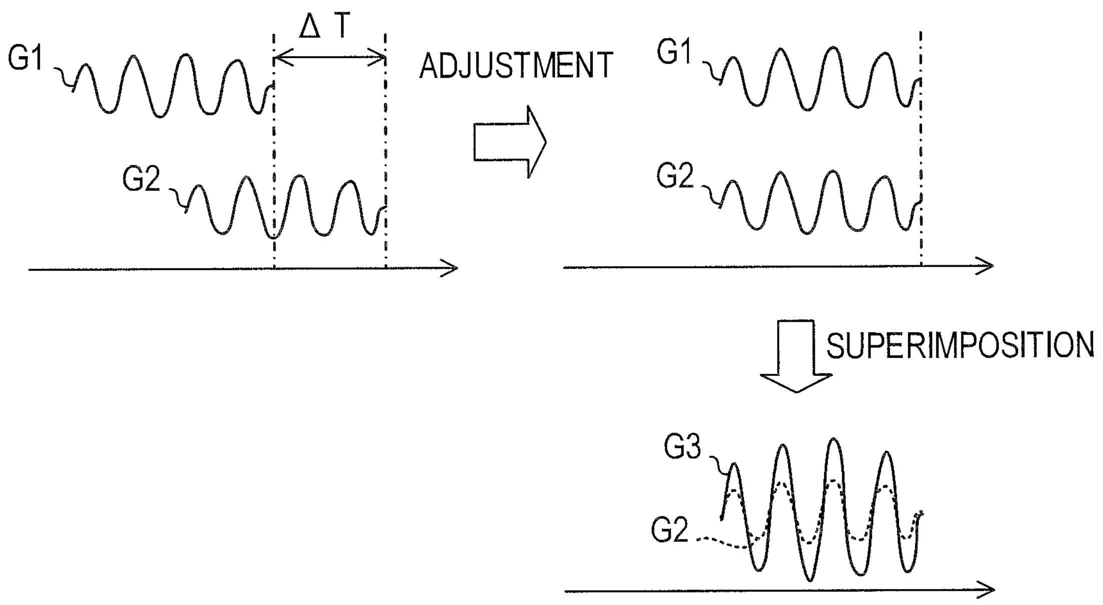
FIG. 8 is an explanatory diagram related to synthesis of target noise components.

FIG. 8 illustrates that, due to phase adjustment by delaying the sound signal G1 from the first reference microphone 53 among the sound signals G1, G2 from the reference microphones 53, 54, the target noise components are in phase with each other between the reference microphones 53, 54. FIG. 8 further illustrates that the target noise component is enhanced in the superimposed signal G3. The signal shown by a broken line in FIG. 8 is the sound signal G2 from the second reference microphone 54, which is drawn as a comparison with the superimposed signal.

Figure 9:
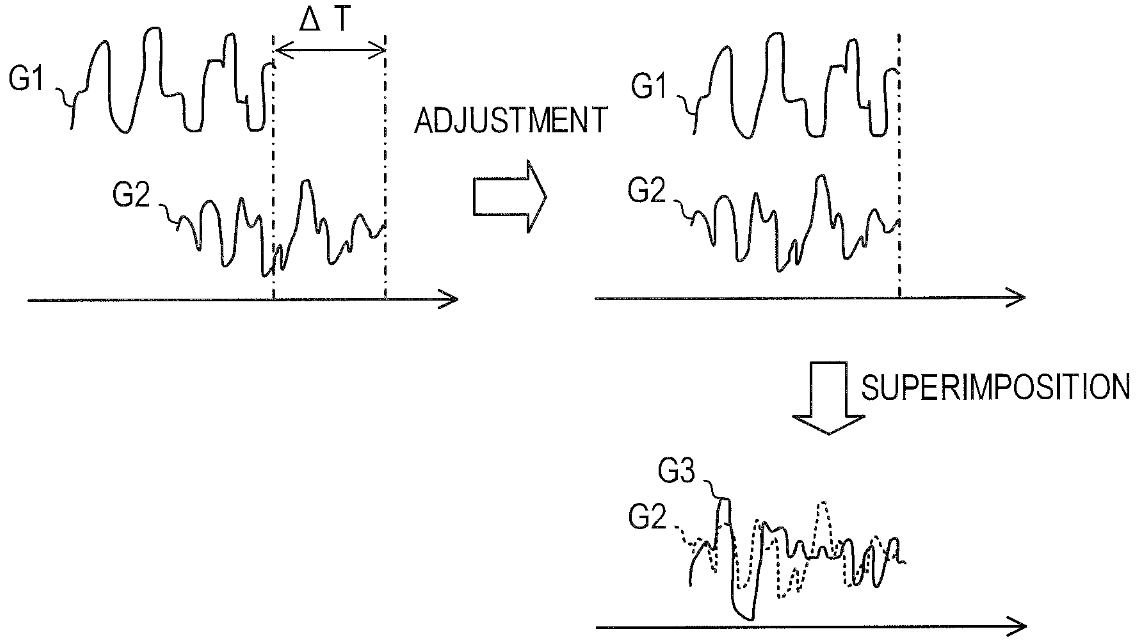
FIG. 9 is an explanatory diagram related to synthesis of wind noise components.

FIG. 9 shows results of the superimposition in a case where the sound signals from the reference microphones 53, 54 include only unnecessary components including the wind noise component. The target noise components contained in the sound signals have high correlation between the reference microphones 53, 54. On the other hand, the unnecessary components have no or low correlation between the reference microphones 53, 54. Accordingly, the unnecessary components are not enhanced by superimposing the sound signals G1, G2 and are canceled.

As above, in the present embodiment, the target noise is enhanced based on the sound signals from the reference microphones 53, 54, and the superimposed signal with less unnecessary components is generated in the signal process circuit 446. This superimposed signal is input to the control circuit 441.

The A/D converter 447 for the error microphone 57 shown in FIG. 7 converts the sound signal from the error microphone 57 to a digital signal and supplies the digital signal to the control circuit 441. The D/A converter 448 converts the control data from the control circuit 441 to analog data, and thereby generates a control signal to be supplied to the control speaker 55.

The control circuit 441 controls the dust collection circuit group 442. As a result, a process for achieving the function as the dust collector 1 is executed. The control circuit 441 also executes a noise reduction process for reducing the target noise.

The control circuit 441 executes a noise control process. As a result, feed-forward active noise control (ANC) is achieved. By ANC, the control sound for reducing propagation of the operating noise outside the housing 30, in other words, the control sound for canceling the target noise, is output from the control speaker 55.

2.3. ANC Model

Figure 10:
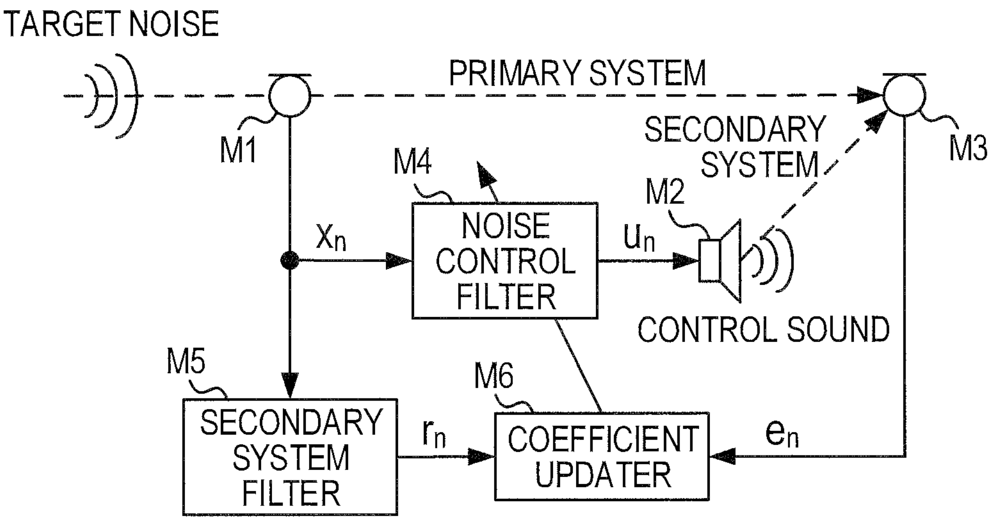
FIG. 10 is a block diagram showing a feed-forward ANC model.

Referring to FIG. 10, the feed-forward ANC model applied to the dust collector 1 will be described. The feed-forward ANC model includes a reference sensor M1, a control sound source M2, an error sensor M3, a noise control filter M4, a secondary system filter M5, and a coefficient updater M6.

The reference sensor M1 corresponds to the reference microphones 53, 54, the A/D converters 444, 445, and the signal process circuit 446. The control sound source M2 corresponds to the D/A converter 448 and the control speaker 55. The error sensor M3 corresponds to the error microphone 57 and the A/D converter 447.

All of the noise control filter M4, the secondary system filter M5, and the coefficient updater M6 may be implemented by processes of the control circuit 441, that is, software. Alternatively, some or all of the noise control filter M4, the secondary system filter M5, and the coefficient updater M6 may be implemented by hardware.

The reference sensor M1 generates a reference signal $x_n$ by collecting the target noise. The reference signal $x_n$ corresponds to a superimposed signal generated in the signal process circuit 446 based on the sound signals from the reference microphones 53, 54. The reference signal is generated by sampling the sound signal at a specific sampling cycle. The subscript "n" represents discrete time, and indicates that the corresponding reference signal $x_n$ is the $n^{th}$ sampling data.

The noise control filter M4 is a finite impulse response (FIR) filter including L taps. "L" is a positive integer. The noise control filter M4 generates a control signal $u_n$ from an L-dimensional reference vector x(n) having L reference signals $\{x_n, x_{n-1}, \ldots, x_{n-L+1}\}$ that are most recently detected.

The control sound source M2 produces a control sound in accordance with the control signal $u_n$. The error sensor M3 generates an error signal $e_n$ by collecting the combined sound of the target noise and the control sound. The error signal $e_n$ corresponds to a digital signal generated by sampling the sound signal from the error microphone 57 at a specific sampling cycle.

Hereinafter, a sound propagation path from the reference sensor M1 to the error sensor M3 is referred to as a primary system, and a sound propagation path from the control sound source M2 to the error sensor M3 is referred to as a secondary system. The secondary system filter M5 is a FIR filter including N taps. "N" is a positive integer. The secondary system filter M5 generates a filtered reference signal $r_n$ from an N-dimensional reference vector x(n) having N reference signals $\{x_n, x_{n-1}, \ldots, x_{n-N+1}\}$ that are most recently detected.

The secondary system filter M5 is a filter modeled on the transfer characteristics of the secondary system. A fixed value is used for a coefficient of each tap. The filtered reference signal $r_n$ is a signal obtained by adding the influence of the secondary system, which is added to the control sound when the control sound reaches the error sensor M3, to the reference signal $x_n$.

The coefficient updater M6 updates the coefficients $\{w_1, w_2, \ldots w_L\}$ of L taps included in the noise control filter M4 based on the filtered reference signal $r_n$ and the error signal $e_n$. The coefficients $\{w_1, w_2, \ldots, w_L\}$ are updated at the position of the error sensor M3 (that is, the noise canceling point) so that the target noise and the control sound cancel each other out and the error signal $e_n$ becomes the smallest.

The coefficients of the noise control filter M4 may be updated with, for example, the Filtered-x NLMS algorithm that is one of adaptive algorithms. Due to the coefficient update, the target noise attenuates to be canceled by the control sound outside the housing 30.

2.4. Effect of Dust Collector

The dust collector 1 of the present embodiment described in the above achieves the following effects.

(2.4.1) The operating noise generated inside the housing 30 of the dust collector 1 and leaking outside the housing 30 through the exhaust port is collected by the reference microphones 53, 54 provided along the exhaust path. The control sound for canceling the operating noise that propagates outside the housing 30 is output from the control speaker 55. Accordingly, it is possible to effectively inhibit the operating noise of the dust collector 1 from spreading to the surroundings as unpleasant noise.

(2.4.2) The sound signals from the reference microphones 53, 54 are superimposed so that the operating noise component is enhanced and the unnecessary components are canceled by the signal process circuit 446. Due to the superimposition, the wind noise component in particular as pseudo-sound component with low correlation between the reference microphones 53, 54 is canceled. Accordingly to this dust collector 1, it is possible to effectively collect the operating noise in the exhaust path and reduce unwanted influence on ANC due to collection of wind noise.

Specifically, the wind noise component is the pseudo-sound component which is not audible to the operator. If the wind noise component is treated in the same manner as the operating noise in ANC, the effect of reducing the operating noise by ANC may be deteriorated. The present embodiment inhibits this possible deterioration.

Deterioration of the effect of canceling the operating noise by the control sound due to the wind noise component can be effectively inhibited. As a result, the dust collector 1 in which the operating noise audible to the user is low can be configured.

(2.4.3) The reference microphones 53, 54 are arranged in the exhaust path between the drive machine 43 which is a sound source of the operating noise and the exhaust port 361 from which the external noise enters. Moreover, the reference microphones 53, 54 are arranged in the exhaust path at different distances from the drive machine 43 and at different distances along the exhaust path from the exhaust port 361. As a result, it is possible to generate the superimposed signal in the signal process circuit 446 so that the operating noise component is enhanced and the external noise component is canceled.

According to the present embodiment, even in a case where the reference microphones 53, 54 collect the external noise entering from the exhaust port 361, the influence of the external noise can be reduced and ANC can be properly performed. However, depending on the combination of the distances of the reference microphones 53, 54 to the drive machine 43 and to the exhaust port 361, there may be exceptional cases where the external noises are in phase between the sound signals superimposed on each other. With this in mind, the reference microphones 53, 54 may be arranged so that the external noises are not in phase.

2.5. Variation of Microphone Arrangement

Figure 6:
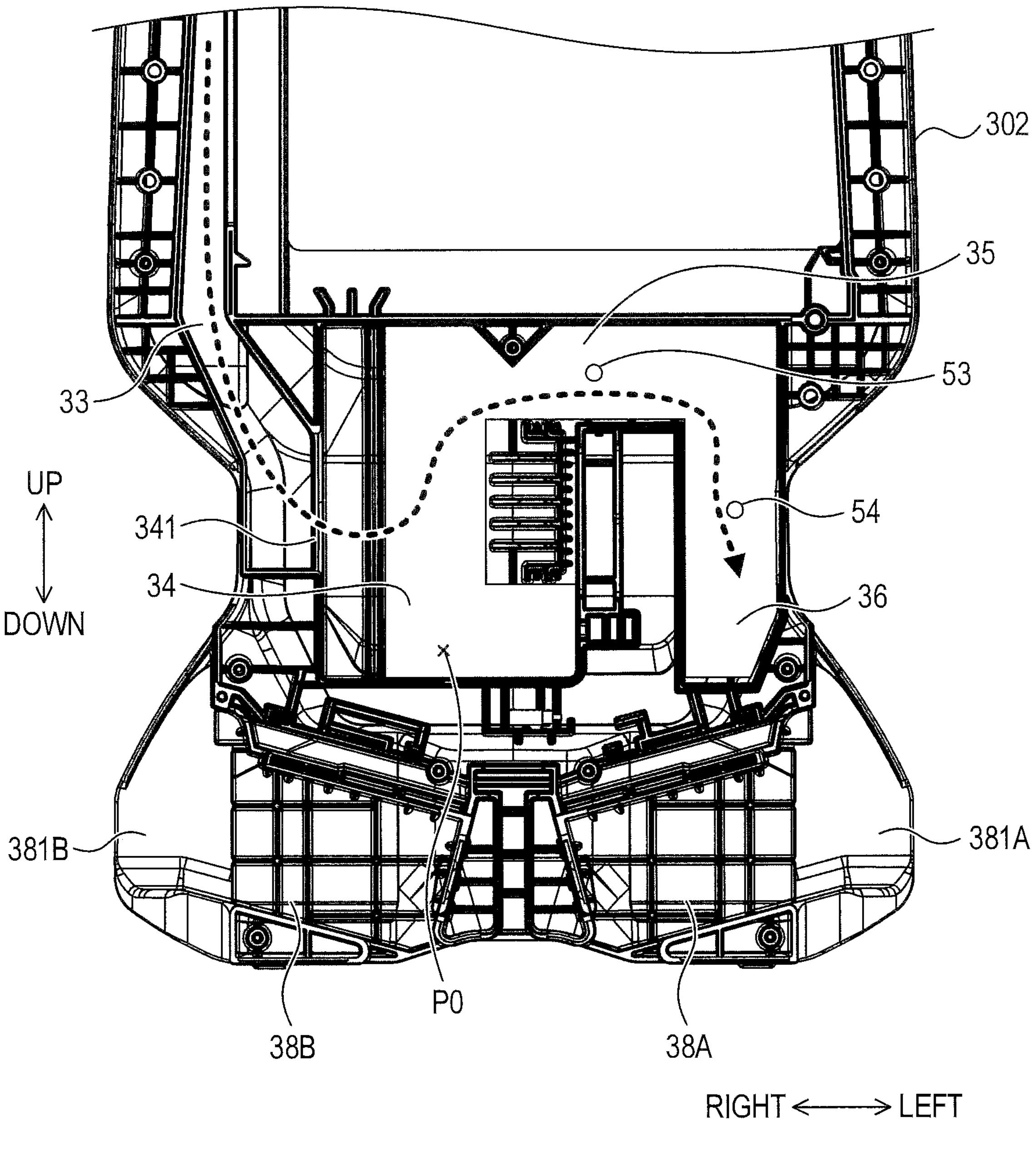
FIG. 6 is a partly enlarged plan view of the front housing, as seen from the joining surface between the front housing and the rear housing.

In the aforementioned dust collector 1, the arrangement of the reference microphones 53, 54 is not limited to the examples shown in FIGS. 4 to 6. For example, the first reference microphone 53 may be arranged at a position P0 near the drive machine 43. According to this example, the first reference microphone 53 is arranged in the motor chamber 34 of the dust collector 1, and the second reference microphone 54 is arranged in the exhaust path, specifically in the third flow path 36.

3. Microphone Arrangement

The reference microphones 53, 54 may be arranged inside the housing 3 between a sound source R1 of the target noise and an opening R2 from which the external noise may enter, in the relationship as below. Below, various examples of microphone arrangement will be described with reference to FIGS. 11A, 11B, 12A, 12B, 13A, and 13B.

3.1 First Microphone Arrangement

Figure 11A:
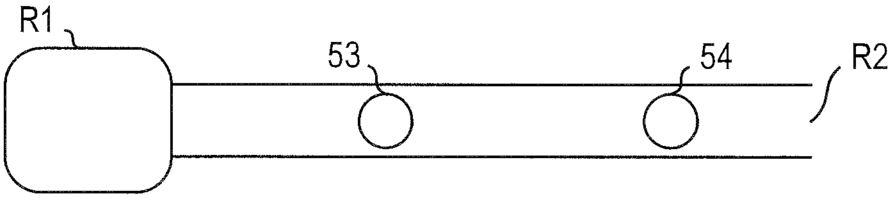
FIG. 11A and FIG. 11B each is an explanatory diagram related to an arrangement of reference microphones at different distances from a sound source and an opening.
Figure 11B:
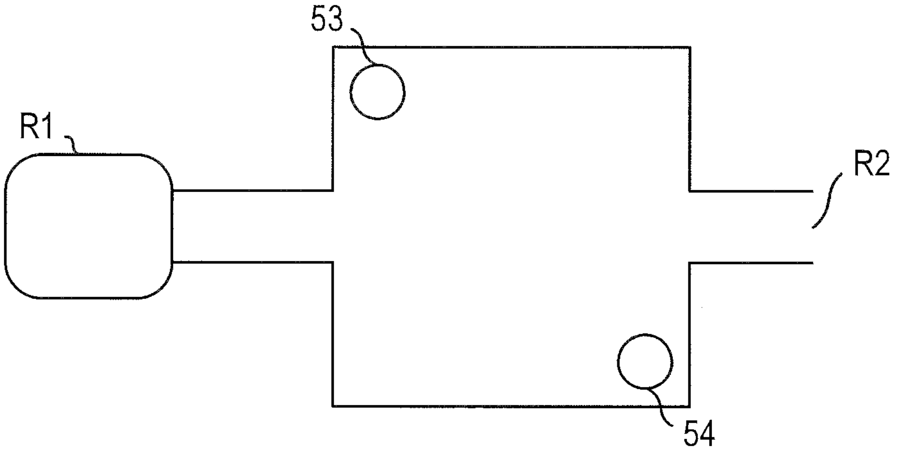

As shown in FIGS. 11A and 11B, the reference microphones 53, 54 may be arranged at different distances from the sound source R1, and at different distances from the opening R2. In FIG. 11A, the reference microphones 53, 54 are aligned along the path between the sound source R1 and the opening R2. In FIG. 11B, the reference microphones 53, 54 are arranged off the center of the path in a large room centered in the path between the sound source R1 and the opening R2.

According to the arrangement of the reference microphones 53, 54 at different distances from the sound source R1, and at different distances from the opening R2, it is possible to easily achieve superimposition of the sound signals that can reduce the wind noise component and the external noise component relative to the target noise while enhancing the target noise.

3.2 Second Microphone Arrangement

Figure 12A:
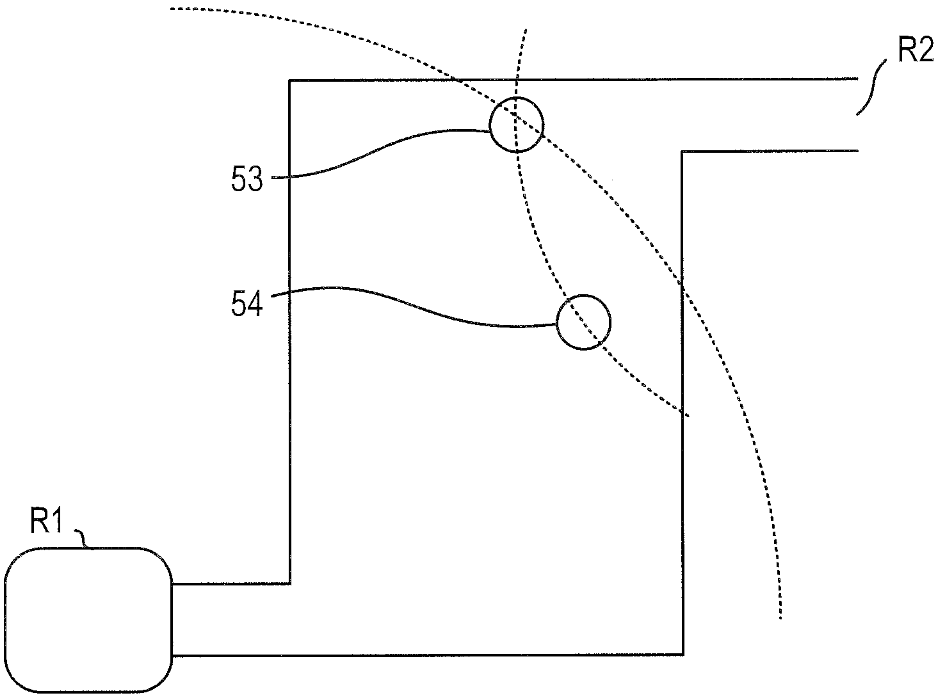
FIG. 12A and FIG. 12B each is an explanatory diagram related to an arrangement of reference microphones at different distances from a sound source and at the same distance from an opening.
Figure 12B:
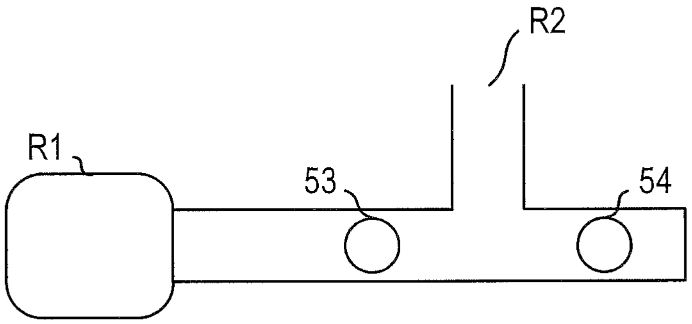

As shown in FIGS. 12A and 12B, the reference microphones 53, 54 may be arranged at the same distance from the opening R2 but at different distances from the sound source R1. Two broken lines shown in FIG. 12A indicate an arc that passes points at the same distance from the sound source R1 and an arc that passes points at the same distance from the opening R2.

In FIG. 12A, the reference microphones 53, 54 are arranged in a large room centered in the path between the sound source R1 and the opening R2. In this room, the reference microphones 53, 54 are arranged at the same distance from the opening R2 but at different distances from the sound source R1.

In FIG. 12B, the reference microphones 53, 54 are arranged in a two-fork path branching from the path extending from the opening R2. The two-fork path includes a first fork path toward the sound source R1 and a second fork path away from the sound source R1. The reference microphones 53, 54 are respectively arranged in the first fork path and the second fork path at the same distance from the opening R2 but at different distances from the sound source R1.

This arrangement allows cancellation of the wind noise component and the external noise component while enhancing the target noise by superimposing the sound signals with signal delay in the signal process circuit 446.

3.3 Third Microphone Arrangement

Figure 13A:
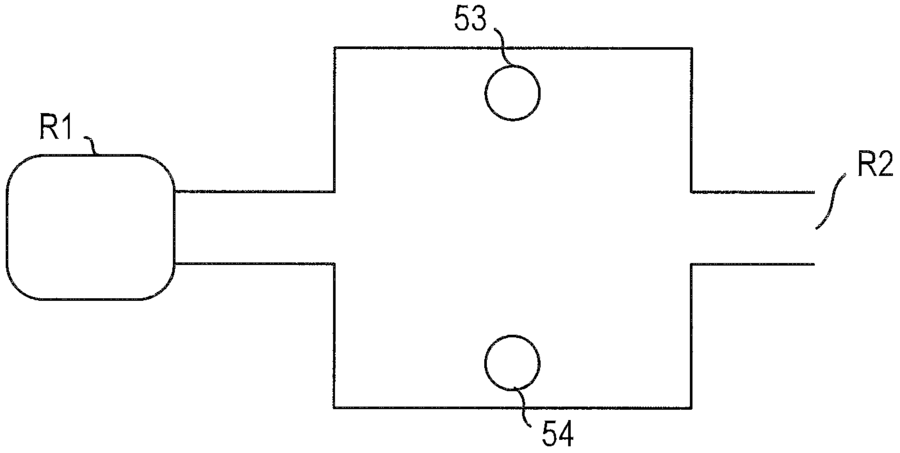
FIG. 13A and FIG. 13B each is an explanatory diagram related to an arrangement of reference microphones at the same distance from a sound source and an opening.
Figure 13B:
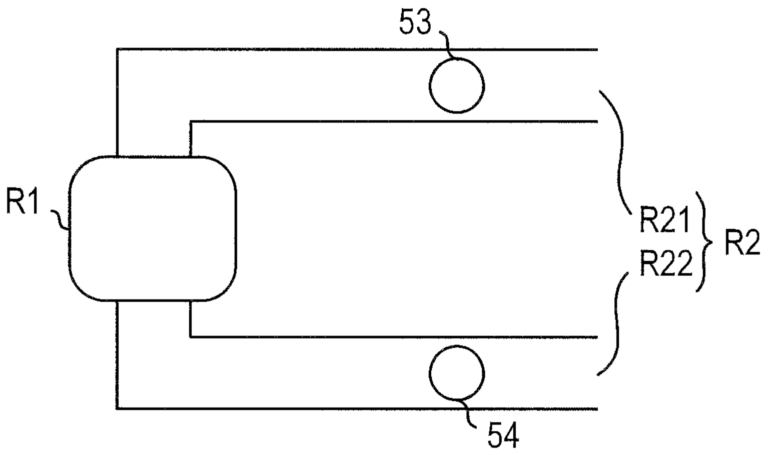

As shown in FIGS. 13A and 13B, the reference microphones 53, 54 may be arranged at the same distance from the sound source R1 and at the same distance from the opening R2. In FIG. 13A, the reference microphones 53, 54 are arranged in a large room centered in the path between the sound source R1 and the opening R2 at the same distance from the sound source R1 and the opening R2. In FIG. 13B, the reference microphones 53, 54 are arranged in two paths extending from two openings R21, R22, as the opening R2, to the sound source R1 at the same distance from the sound source R1 and the openings R21, R22.

Figure 14:
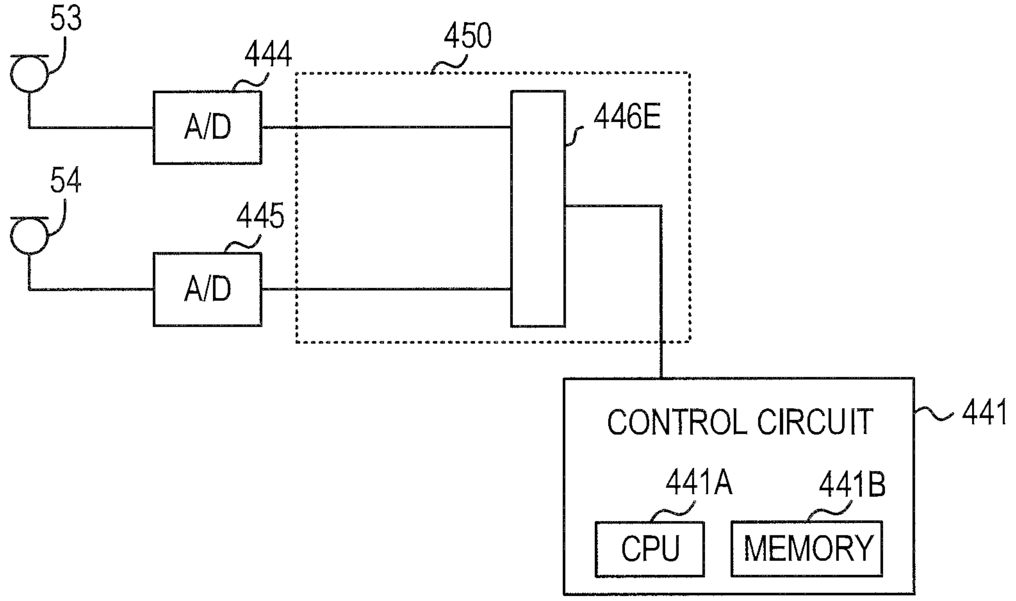
FIG. 14 is a block diagram showing a configuration of a signal process circuit of a first variation.

When the reference microphones 53, 54 are arranged at the same distance from the sound source R1, a superimposed signal with the enhanced target noise component can be generated without the delayer 446A. Accordingly, in this microphone arrangement, as shown in FIG. 14, a signal process circuit 450 that does not include the delayer 446A and only includes the synthesizer 446E may be provided in the signal processing circuit group 443, in place of the signal process circuit 446.

When the influence of the external noise on ANC is small, or when the influence of the external noise is not considered, employing such an arrangement of the reference microphones 53, 54 can simplify the configuration of the signal process circuit 450.

3.4 Fourth Microphone Arrangement

The reference microphones 53, 54 may be arranged at the same distance from the sound source R1 and at different distances from the opening R2. For example, in FIGS. 12A and 12B, the position of the sound source R1 and the position of the opening R2 may be reversed. According to the configurations, the reference microphones 53, 54 are arranged at the same distance from the sound source R1 but at different distances from the opening R2.

Arrangement of the reference microphones 53, 54 as such allows generation of a superimposed signal with the enhanced target noise component without the delayer 446A. Accordingly, the signal process circuit 450 shown in FIG. 14 may be provided in the signal processing circuit group 443, in place of the signal process circuit 446. Moreover, with this microphone arrangement, since the distances of the reference microphones 53, 54 from the opening R2 differ, the external noise component can be canceled at the time of superimposing the sound signals.

4. Variation of Signal Process Circuit

Figure 15A:
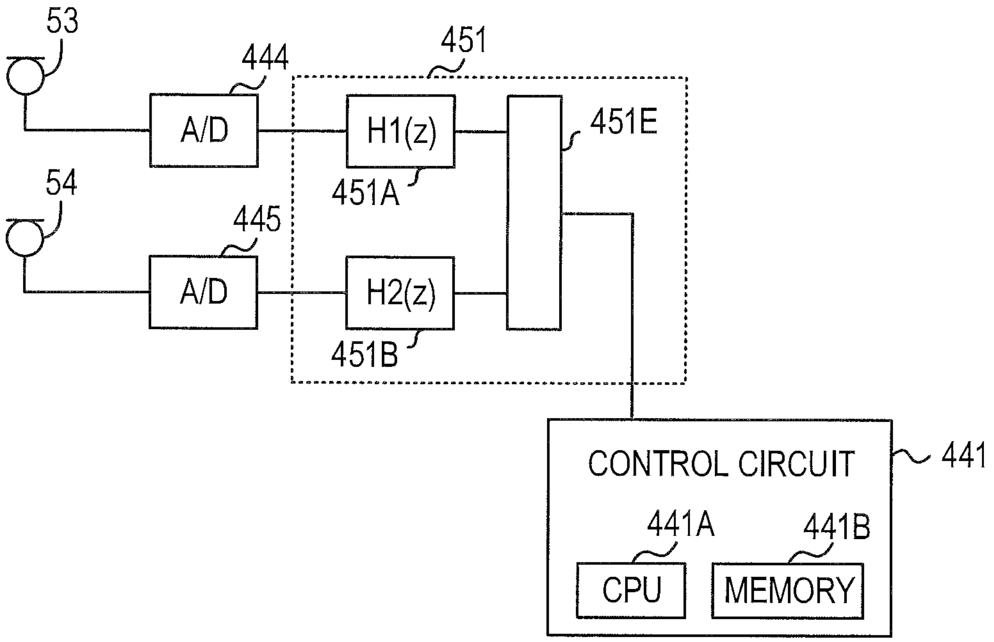
FIG. 15A is a block diagram showing a configuration of a signal process circuit of a second variation.

The signal process circuit 446 shown in FIG. 7 may be replaced with a signal process circuit 451 shown in FIG. 15A.

The signal process circuit 451 shown in FIG. 15A includes a first transfer filter 451A, a second transfer filter 451B, and a synthesizer 451E.

The first transfer filter 451A converts the sound signal input from the first reference microphone 53 through the first A/D converter 444 to a first virtual-sound signal in accordance with a specific transfer function H1(z), and inputs the first virtual-sound signal to the synthesizer 451E. "$z^{-1}$" is a delay operator.

Figure 15B:
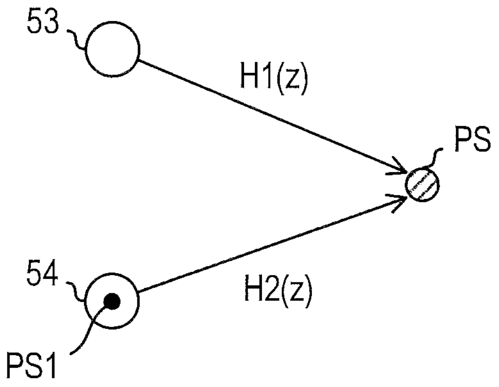
FIG. 15B is an explanatory diagram related to signal synthesis of the second variation.

The first virtual-sound signal corresponds to a sound signal output from the virtual microphone when it is assumed that the operating noise collected by the first reference microphone 53 propagates from the sound source to a specific position PS (see FIG. 15B) common to the reference microphones 53, 54 and is collected by the virtual microphone.

The transfer function H1(z) is expressed by a formula H1(z)=H0(z)/H11(z), when the transfer characteristics of sound from the sound source to the first reference microphone 53 are represented by a transfer function H11(z), and the transfer characteristics from the sound source to the virtual microphone are represented by a transfer function H0(z), for example. That is, the transfer function H1(z) corresponds a transfer function H0(z)/H11(z) based on the transfer characteristics of sound from the sound source to the virtual microphone (in other words, specific position PS) relative to the transfer characteristics of sound from the sound source to the first reference microphone 53.

The second transfer filter 451B converts the sound signal input from the second reference microphone 54 through the second A/D converter 445 to a second virtual-sound signal in accordance with a specific transfer function H2(z), and inputs the second virtual-sound signal to the synthesizer 451E.

The second virtual-sound signal corresponds to a sound signal output from the virtual microphone when it is assumed that the operating noise collected by the second reference microphone 54 propagates to the specific position PS common to the reference microphones 53, 54 from the sound source and is collected by the virtual microphone.

The transfer function H2(z) is expressed by a formula H2(z)=H0(z)/H21(z), when the transfer characteristics of sound from the sound source to the second reference microphone 54 are represented by a transfer function H21(z), and the transfer characteristics of sound from the sound source to the virtual microphone are represented by the transfer function 110(*z*), for example. That is, the transfer function H2(z) corresponds to a transfer function H0(z)/H21(z) based on the transfer characteristics of sound from the sound source to the virtual microphone (in other words, specific position PS) relative to the transfer characteristics of sound from the sound source to the second reference microphone 54.

The synthesizer 451E superimposes the first virtual-sound signal on the second virtual-sound signal to enhance the target noise component in the sound signals from the reference microphones 53, 54, and generates a superimposed signal with reduced other unnecessary components. The synthesizer 451E inputs the superimposed signal to the control circuit 441.

This variation also allows implementation of ANC in which the influence of unnecessary components in the sound signals from the reference microphones 53, 54 is reduced.

In addition, for example, the position PS of the virtual microphone may be set to the same position PS1 as the second reference microphone 54. In this case, the second transfer filter 451B can be removed from the signal process circuit 451, and the sound signal from the second reference microphone 54 can be input to the synthesizer 451E without the transfer filter 451B. Alternatively, in the signal process circuit 451, H2(z)=1 can be set. At this time, a formula H0(z)=H21(z) is satisfied.

In this case, the sound signal from the first reference microphone 53 is converted to a virtual-sound signal by the first transfer filter 451A using the transfer function H1(z) =H0(z)/H11(z) based on the transfer characteristics of sound from the sound source to the second reference microphone 54 relative to the transfer characteristics of sound from the sound source (that is, drive machine 43) to the first reference microphone 53.

Specifically, the sound signal from the first reference microphone 53 is converted to a virtual-sound signal corresponding to the sound signal output from the second reference microphone 54 when it is assumed that the corresponding operating noise propagates to the second reference microphone 54 and is collected by the second reference microphone 54. The virtual-sound signal is superimposed on the sound signal of the second reference microphone 54 by the synthesizer 451E. As a result, the superimposed signal with the enhanced operating noise component is generated.

5. Variation Regarding the Number of Reference Microphones

The dust collector 1 may include an additional reference microphone 54A. Specifically, three or more reference microphones 53, 54, 54A may be provided inside the housing 30. In this case, the signal process circuits 446, 451 may be replaced with a signal process circuit 452 shown in FIG. 16A.

Figure 16A:
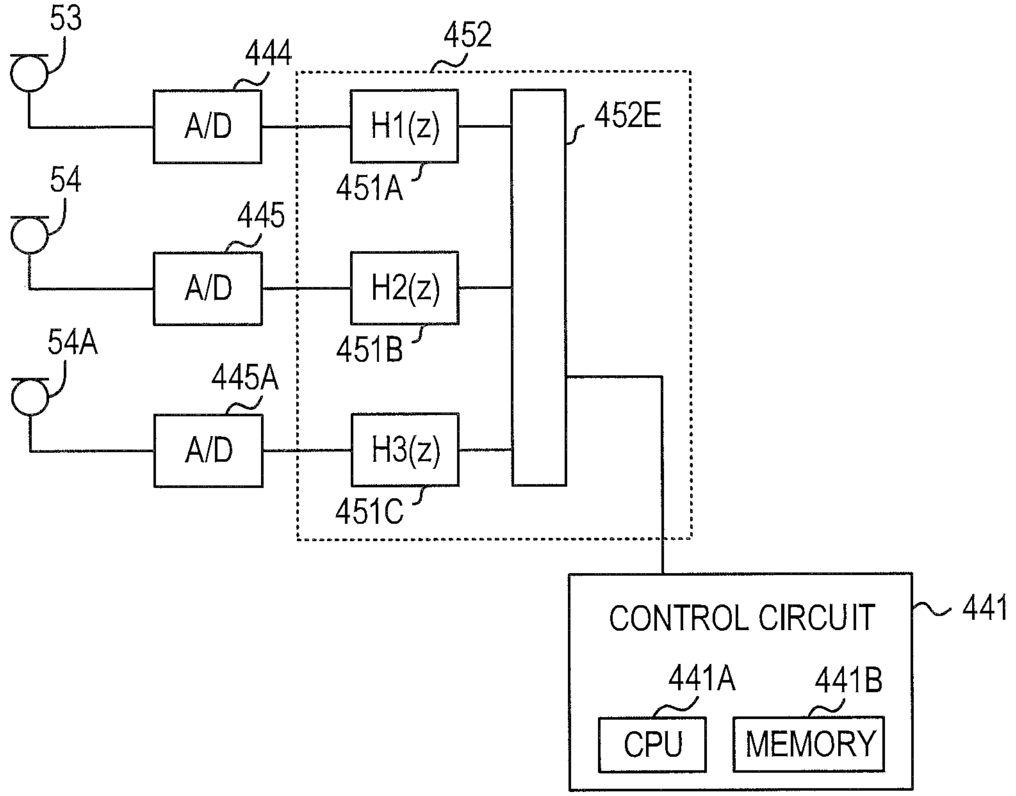
FIG. 16A is a block diagram showing a configuration of a signal process circuit of a third variation.

The signal process circuit 452 shown in FIG. 16A includes the first transfer filter 451A, the second transfer filter 451B, a third transfer filter 451C, and a synthesizer 452E. The signal processing circuit group 443 may further includes a third A/D converter 445A. The third A/D converter 445A converts a sound signal from a third reference microphone 54A to a digital signal and supplies the digital signal to the signal process circuit 452.

The first transfer filter 451A, like the signal process circuit 451, converts the sound signal from the first reference microphone 53 to the first virtual-sound signal, and inputs the first virtual-sound signal to the synthesizer 452E.

The second transfer filter 451B, like the signal process circuit 451, converts the sound signal from the second reference microphone 54 to the second virtual-sound signal, and inputs the second virtual-sound signal to the synthesizer 452E.

The third transfer filter 451C converts a sound signal input from the third reference microphone 54A through the third A/D converter 445A to a the third virtual-sound signal in accordance with a specific transfer function H3(z), and inputs the third virtual-sound signal to the synthesizer 452E.

The third virtual-sound signal corresponds to the sound signal output from the virtual microphone when it is assumed that the operating noise collected by the third reference microphone 54A propagates from the sound source to the specific position PS (see FIG. 16B) common to the reference microphones 53, 54, 54A and is collected by the virtual microphone.

The transfer function H3(z) corresponds to a formula H3(z)=H0(z)/H31(z) when the transfer characteristics of sound from the sound source to the third reference microphone 54A are represented by a transfer function H31(z), and the transfer characteristics of sound from the sound source to the virtual microphone are represented by a transfer function H0(z), for example. Specifically, the transfer function H3(z) corresponds to a transfer function H0(z)/H31(z) based on the transfer characteristics of sound from the sound source to the virtual microphone (in other words, specific position PS) relative to the transfer characteristics of sound from the sound source to the third reference microphone 54A.

The synthesizer 452E can superimpose the first virtual-sound signal, the second virtual-sound signal, and the third virtual-sound signal to enhance the target noise component in the sound signals from the reference microphones 53, 54, 54A, generate a superimposed signal with reduced other unnecessary components, and input the superimposed signal to the control circuit 441.

Figure 16B:
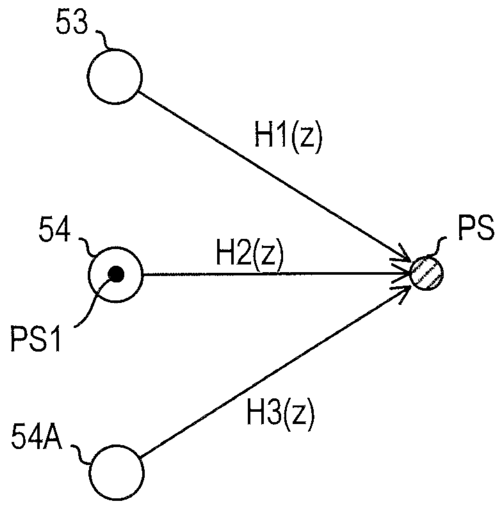
FIG. 16B is an explanatory diagram related to signal synthesis of the third variation.

In the examples shown in FIGS. 16A and 16B, the specific position PS may be set to the same position PS1 as the second reference microphone 54. In this case, the second transfer filter 451B can be removed from the signal process circuit 452, and the sound signal from the second reference microphone 54 is input to the synthesizer 452E without the transfer filter 451B. Alternatively, in the signal process circuit 452 H2(z)=1 can be set. At this time, a formula H0(z)=H21(z) is satisfied.

In this case, the sound signal from the first reference microphone 53 is converted to a virtual-sound signal by the first transfer filter 451A using the transfer function H1(z)=H0(z)/H11(z) based on the transfer characteristics of sound from the sound source to the second reference microphone 54 relative to the transfer characteristics of sound from the sound source (that is, drive machine 43) to the first reference microphone 53.

The sound signal from the third reference microphone 54A is converted to a virtual-sound signal by the third transfer filter 451C using the transfer function H3(z)=H0(z)/H31(z) based on the transfer characteristics of sound from the sound source to the second reference microphone

54 relative to the transfer characteristics of sound from the sound source to the third reference microphone 54A. In the synthesizer 452E, a superimposed signal of the virtual-sound signals and the sound signal from the second reference microphone 54 is output.

If more reference microphones are added and four or more reference microphones are arranged inside the housing 30, each additional reference microphone can be provided with an A/D converter and a transfer filter which correspond to the added reference microphone.

The synthesizer 452E can superimpose virtual-sound signals corresponding to sound signals from these four or more reference microphones, and input the superimposed signal to the control circuit 441. The specific position PS may be set to the same location as one of the four or more reference microphones. The sound signal from the corresponding reference microphone may be directly input to the synthesizer 452E without providing a transfer filter to the reference microphone arranged at the same location as the specific position PS.

With the aforementioned technique, it is possible to use four or more reference microphones to enhance the target noise component of the sound signal, generate a superimposed signal of the sound signal with reduced other unnecessary components, and implement ANC that reduces the influence of unnecessary components.

Even if the transfer filters 451A, 451B, 451C are replaced with delayers, the same effect is obtained. The transfer filter 451A may be replaced with a delayer that forms signal delay corresponding to transfer delay of the target noise to the virtual microphone based on arrival time of the target noise to the first reference microphone 53. For example, when the arrival time of the target noise to the first reference microphone 53 is T1, and the arrival time of the target noise to the virtual microphone is TS, the delayer may be configured to form a signal delay TS−T1.

Similarly, the transfer filter 451B may be replaced with a delayer that forms signal delay corresponding to transfer delay of the target noise to the virtual microphone based on arrival time of the target noise to the second reference microphone 54. The transfer filter 451C may be replaced with a delayer that forms signal delay corresponding to transfer delay of the target noise to the virtual microphone based on arrival time of the target noise to the third reference microphone 54A. Alternatively, each of the transfer filters 451A, 451B, 451C may function as a corresponding delayer. Specifically, transfer characteristics of the transfer filters 451A, 451B, 451C may be defined such that the transfer filters 451A, 451B, 451C function as corresponding delayers.

6. Others (6.1) According to the aforementioned embodiments and variations, the outputs from the microphones 53, 54 are used for ANC. However, the outputs from the microphones 53, 54 may be used for failure detection of the dust collector 1 based on the operating noise of the dust collector 1. In this case, the control speaker 55 and the error microphone 57 need not be provided in the dust collector 1.

(6.2) All or part of the functions of the circuit configuration (specifically, the signal processing circuit group 443) located between the microphones (specifically, the reference microphones 53, 54, 54A and the error microphone 57), the speaker (specifically, the control speaker 55), and the microcomputer may be implemented by a microcomputer, for example, by the control circuit 441.

FIG. 7 illustrates the control circuit 441 and the signal processing circuit group 443 as separate circuits. However, all or part of the functions of the A/D converters 444, 445, 447, the signal process circuit 446, and the D/A converter 448 may be implemented by a microcomputer, for example, by the control circuit 441.

All or part of the functions of the signal process circuit 446 (specifically, the delayer 446A and the synthesizer 446E) may be implemented by digital processing of the microcomputer. For the purpose of high speed processing or for another purpose, all or part of the functions of the signal process circuit 446 may be implemented by analog processing.

The control circuit 441 may be configured by a microcomputer including one or more A/D conversion ports and/or one or more D/A conversion ports. Regardless of the fact that the microcomputer or the control circuit 441 includes A/D conversion ports and/or D/A conversion ports, all or part of the A/D converters and D/A converter may be arranged in the drive controller 44 as external devices or an external device for the microcomputer.

Similarly, the functions of the A/D converters 444, 445 and the signal process circuit 450 shown in FIG. 14 may be implemented by the microcomputer, for example, by the control circuit 441. All or part of the functions of the signal process circuit 450 (specifically, the synthesizer 446E) may be implemented by digital processing of the microcomputer or by analog processing.

Similarly, the functions of the A/D converters 444, 445 and the signal process circuit 451 shown in FIG. 15A may be implemented by the microcomputer, for example, by the control circuit 441. All or part of the functions of the signal process circuit 451 (specifically, the transfer filters 451A, 451B and the synthesizer 451E) may be implemented by digital processing of the microcomputer or by analog processing.

Similarly, the A/D converters 444, 445, 445A and the signal process circuit 452 shown in FIG. 16A may be implemented by the microcomputer, for example, by the control circuit 441. All or part of the functions of the signal process circuit 452 (specifically, the transfer filters 451A, 451B, 451C and the synthesizer 452E) may be implemented by digital processing of the microcomputer or by analog processing.

(6.3) The technique of the present disclosure is not limited to application to the dust collector 1. The technique of the present disclosure may be applied to a work machine used in, for example, home carpentry, manufacturing, gardening, and/or construction work sites, in particular to a work machine that uses airflow from a fan. The technique of the present disclosure may be applied to a working machine for gardening, and/or a work machine that prepares a work site environment. For example, the technique of the present disclosure may be applied to various electric work machines such as electric lawn mower, electric grass trimmer, electric grass cutter, electric cleaner, electric blower, electric sprayer, electric spreader, electric dust collector, etc.

(6.4) A plurality of functions performed by a single element in the above-described embodiments may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration in the above-described embodiments may be omitted. At least a part of a configuration in the above-described embodiments may be added to, or may replace, another configuration in the above-described embodiments.

What is claimed is:

1. A dust collector comprising:

a drive machine for dust collection including a motor and a fan connected to a rotation shaft of the motor;

a housing that houses the drive machine, the housing including an exhaust port;

an exhaust path inside the housing for guiding an airflow generated from the fan by motion of the drive machine to the exhaust port located downstream;

microphones configured to collect sound inside the housing, and output sound signals that are electrical signals corresponding to the sound collected, the sound including an operating noise generated inside the housing by the motion of the drive machine, the microphones being arranged at different locations in the exhaust path; and a processor configured to execute a process related to the operating noise based on the sound signals from the microphones, the microphones including a first microphone and a second microphone, the process related to the operating noise including:

inputting a first sound signal output from the first microphone to one of a delayer and a transfer filter to convert the first sound signal to a virtual-sound signal; and superimposing the virtual-sound signal and a second sound signal output from the second microphone to generate an operating noise signal which is a sound signal with the operating noise enhanced, and the virtual-sound signal corresponding to a sound signal output from the second microphone when it is estimated that the operating noise corresponding to the first sound signal propagates to the second microphone and is collected by the second microphone.

2. A work machine comprising:

a machine;

a housing that at least partly houses the machine;

microphones configured to collect sound inside the housing, and output sound signals that are electrical signals corresponding to the sound collected, the sound including operating noise generated inside the housing by motion of the machine, the microphones being arranged at different locations inside the housing; and a processor configured to execute a process related to the operating noise based on the sound signals from the microphones, the process related to the operating noise including:

converting a sound signal output from at least one of the microphones to a virtual-sound signal; and generating an operating noise signal which is a sound signal with the operating noise enhanced, the virtual-sound signal corresponding to a sound signal output from a virtual microphone when it is estimated that the operating noise propagates to a common specific location and is collected by the virtual microphone, the operating noise signal being generated by superimposing the sound signals from the microphones, and the virtual-sound signal being used for superimposing the sound signals.

3. The work machine according to claim 2, further comprising a speaker, wherein the process related to the operating noise further includes causing the speaker to output a control sound for inhibiting the operating noise from propagating outside the housing.

4. The work machine according to claim 2, wherein
the microphones include two or more microphones arranged at a same distance from a source of the operating noise.

5. The work machine according to claim 2, wherein
the housing has an opening, and
the microphones include two or more microphones arranged at different distances from at least one of a source of the operating noise and the opening.

6. The work machine according to claim 2, wherein
the housing has an opening,
a path for controlling an airflow generated by motion of the machine is provided between the machine and the opening inside the housing, and
the microphones include two or more microphones arranged at different locations in the path.

7. A work machine comprising:
a machine;
a housing that at least partly houses the machine;
microphones configured to collect sound inside the housing, and output sound signals that are electrical signals corresponding to the sound collected, the sound including operating noise generated inside the housing by motion of the machine, the microphones being arranged at different locations inside the housing; and
a processor configured to execute a process related to the operating noise based on the sound signals from the microphones,
the microphones including one or more first microphones and one second microphone,
the process related to the operating noise including:
converting a first sound signal output from each of the one or more first microphones to a virtual-sound, signal; and
generating an operating noise signal which is a sound signal with the operating noise enhanced,
the virtual-sound signal corresponding to a sound signal output from the second microphone when it is estimated that the operating noise propagates to the second microphone and is collected by the second microphone, and
generating the operating noise signal including superimposing the virtual-sound signal on a second sound signal output from the second microphone to generate the operating noise signal.

8. The work machine according to claim 7, wherein
converting the first sound signal to the virtual-sound signal includes inputting the first sound signal to a transfer function for a corresponding first microphone, thereby converting the first sound signal output from the corresponding first microphone to the virtual-sound signal, and the transfer function is a transfer function based on transfer characteristics of sound from a source of the operating noise to the second microphone relative to the transfer characteristics of sound from the source of the operating noise to the corresponding first microphone.

9. The work machine according to claim 7, wherein
converting the first sound signal to the virtual-sound signal includes inputting the first sound signal to a delayer for a corresponding first microphone, thereby converting the first sound signal output from the corresponding first microphone to the virtual-sound signal, and the delayer is a delayer based on transfer delay of sound to the second microphone relative to the corresponding first microphone for the operating noise from a source.

10. The work machine according to claim 7, wherein
the microphones include two or more microphones arranged at a same distance from a source of the operating noise.

11. The work machine according to claim 7, wherein
the housing has an opening, and
the microphones include two or more microphones arranged at different distances from at least one of a source of the operating noise and the opening.

12. The work machine according to claim 7, wherein
the housing has an opening,
a path for controlling an airflow generated by motion of the machine is provided between the machine and the opening inside the housing, and
the microphones include two or more microphones arranged at different locations in the path.

* * * * *